United States Patent
Borkgren (10) Patent No.: US 9,826,676 B2
(45) Date of Patent: Nov. 28, 2017

(54) SEED DISPERSION UNIT

(71) Applicant: Deere & Company, Moline, IL (US)

(72) Inventor: Stanley R. Borkgren, Geneseo, IL (US)

(73) Assignee: DEERE & COMPANY, Moline, IL (US)

(*) Notice: Subject to any disclaimer, the term of this patent is extended or adjusted under 35 U.S.C. 154(b) by 77 days.

(21) Appl. No.: 14/871,686

(22) Filed: Sep. 30, 2015

(65) Prior Publication Data

US 2017/0086350 A1    Mar. 30, 2017

(51) Int. Cl.

| A01C 7/18 | (2006.01) |
|---|---|
| A01C 7/20 | (2006.01) |
| A01C 7/04 | (2006.01) |
| A01C 5/06 | (2006.01) |
| A01C 7/08 | (2006.01) |
| A01C 7/16 | (2006.01) |

(52) U.S. Cl.
CPC ............ A01C 7/042 (2013.01); A01C 5/062 (2013.01); A01C 5/068 (2013.01); A01C 7/084 (2013.01); A01C 7/163 (2013.01)

(58) Field of Classification Search
CPC .... A01C 5/06; A01C 7/04; A01C 7/08; A01C 7/082; A01C 7/084; B65G 53/16; B65G 53/528; F23K 3/00
USPC ........................... 111/175; 406/181; 221/278
See application file for complete search history.

(56) References Cited

U.S. PATENT DOCUMENTS

| 1,825,668 A * | 10/1931 | Kennedy .................. F23K 3/00 |
| | | 406/155 |
| 4,264,242 A * | 4/1981 | Lecomte ................ A01C 7/084 |
| | | 111/73 |
| 6,283,679 B1 | 9/2001 | Gregor et al. |
| 6,688,244 B1 | 2/2004 | Meyer et al. |
| 8,544,498 B2 * | 10/2013 | Petersen ................ A01C 7/084 |
| | | 111/175 |
| 8,635,963 B2 * | 1/2014 | Friggstad ............... A01C 7/084 |
| | | 111/175 |
| 8,690,488 B2 * | 4/2014 | Jagow .................... A01C 7/082 |
| | | 111/175 |
| 8,821,078 B2 * | 9/2014 | Hockett ............... B65G 47/684 |
| | | 111/175 |
| 2001/0016151 A1 * | 8/2001 | Poncelet ................ A01C 7/082 |
| | | 406/86 |
| 2015/0098767 A1 * | 4/2015 | Beaujot .................. A01C 7/084 |
| | | 406/181 |
| 2016/0106026 A1 * | 4/2016 | Roberge ................ A01C 7/082 |
| | | 111/175 |
| 2016/0205866 A1 * | 7/2016 | Funck .................... A01C 7/081 |

* cited by examiner

*Primary Examiner* — John G Weiss (74) *Attorney, Agent, or Firm* — Michael Best & Friedrich LLP (57) ABSTRACT

A seed dispersion unit for distributing a plurality of seeds includes a single inlet for the plurality of seeds, a chamber in communication with the single inlet, and a plurality of outlet conduits in communication with the chamber. Each of the plurality of outlet conduits is configured to transfer a portion of the plurality of seeds from the chamber. An annular base defines a portion of the chamber. Each of the outlet conduits extends radially from the base.

16 Claims, 11 Drawing Sheets

SEED DISPERSION UNIT

BACKGROUND

The present disclosure relates to a seeding and planting system and more particularly to a dispersion unit of the seeding and planting system.

SUMMARY

Current seeding practices tend to involve one of two types of seeding systems: planters and air seeders. Planters generally singulate or individually meter seeds prior to planting and are typically used to disperse seeds where precise placement is required for maximum yield and the seeding rate permits use of singulating technologies. Air seeders generally meter seeds volumetrically and are typically used in high rate seeding applications and where precise seed placement is of less importance or not practical due to the high rates.

A seed dispersion unit for distributing a plurality of seeds includes a single inlet for the plurality of seeds, a chamber in communication with the single inlet, and a plurality of outlet conduits in communication with the chamber. Each of the plurality of outlet conduits is configured to transfer a portion of the plurality of seeds from the chamber. An annular base defines a portion of the chamber. Each of the outlet conduits extends radially from the base.

A seeding system for planting a plurality of seeds includes a frame, a seed dispersion unit coupled to the frame and including an inlet and a chamber at least partially defined by an annular wall, and a plurality of ground openers. Each of the plurality of ground openers is operable to produce a furrow. Each of a plurality of conduits is positioned to transfer a portion of the plurality of seeds from the chamber to one of the furrows. Each of the plurality of conduits extends through the annular wall.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
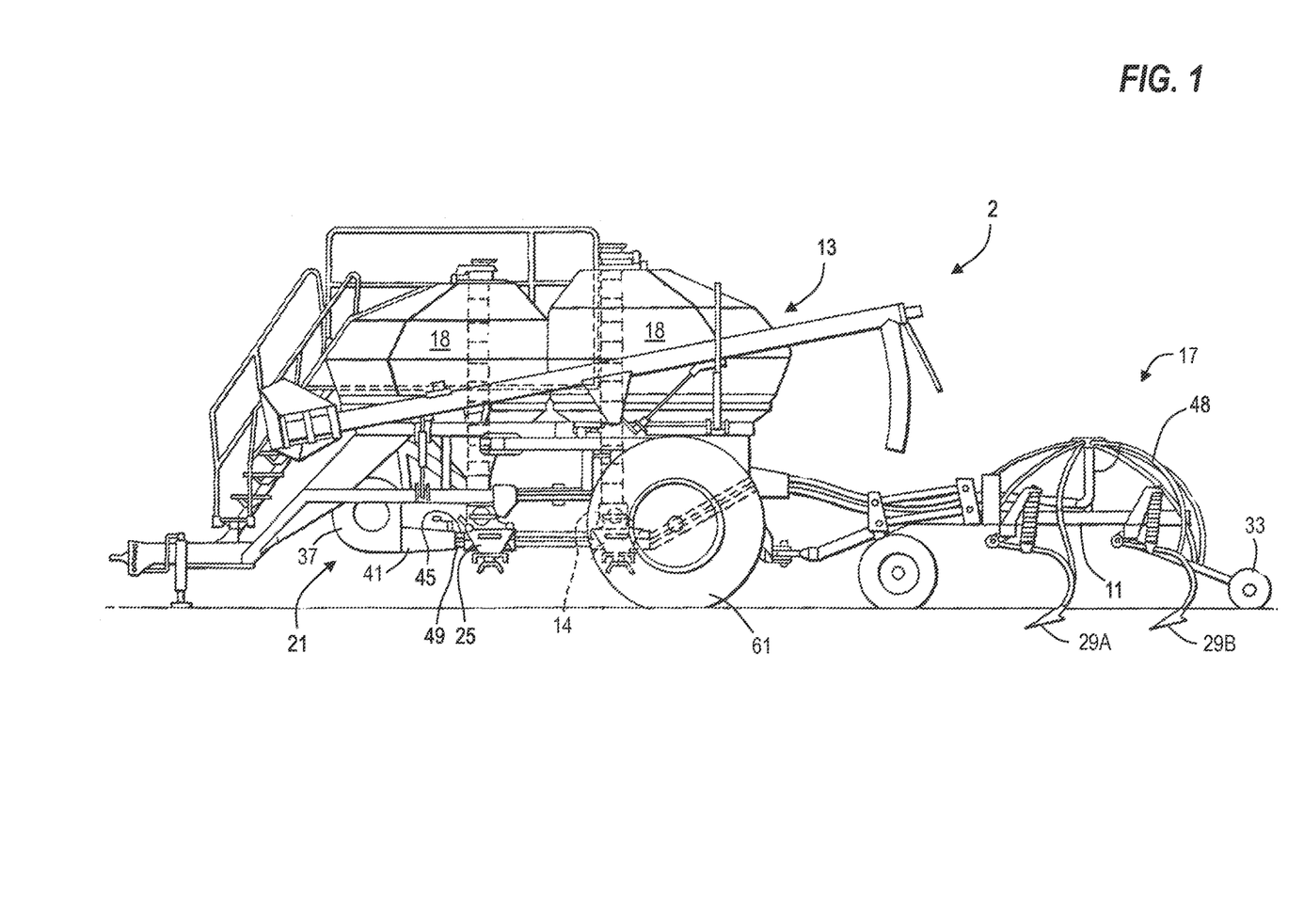
FIG. 1 is a side view of a seeder.

As shown in FIG. 1, seeding apparatus 2 comprises a seed cart 13 and a tilling implement 17. The seed cart 13 is typically towed by a tractor through a field to be seeded. The seed cart 13 has a frame supporting a number of storage tanks 18 with wheels 61 rotatably mounted to the frame. The product contained in the storage tanks 18 may include seed, fertilizer, or other agricultural particles. Each storage tank 18 is provided with a volumetric meter 14. Each volumetric meter 14 is positioned below the respective storage tank 18 and receives product therefrom for controlled feeding of the product into a pneumatic distribution system 21.

The tilling implement 17 in the example shown in FIG. 1 comprises a frame 11 to which ground openers 29 are mounted. The tilling implement 17 may also include seed row finishing equipment such as packers 33. Located below each volumetric meter 14 is a primary air distribution manifold 25, part of the pneumatic distribution system 21. The pneumatic distribution system 21 distributes metered product from the storage tanks 18 to the ground openers 29 and comprises a blower 37 driven by a motor which directs an air current through an adjustable damper 41, which thereafter directs the air stream into a top rank portion or first main conduit 45 and a bottom rank portion or second main conduit 49. FIG. 1 illustrates a double shoot air seeder wherein a first product contained in one of the storage tanks 18 is directed to the first main conduit 45 of the air stream and the second product contained in the other of the storage tanks 18 is directed to the second main conduit 49 of the air stream. The primary air distribution manifolds 25 may be configured to place product from both tanks 18 into the same rank of tubes for single shoot operations.

Figure 2:
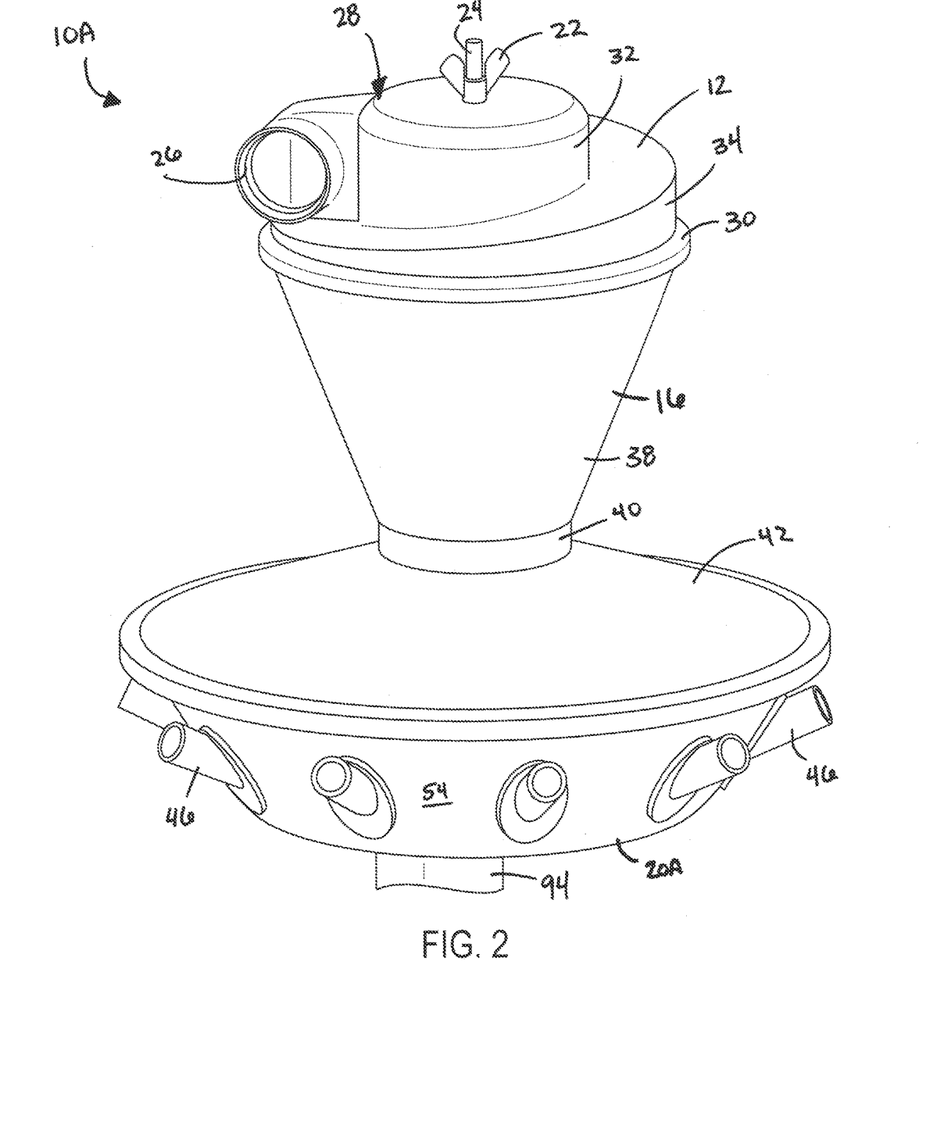
FIG. 2 is a perspective view of a seed dispersion unit.
Figure 3:
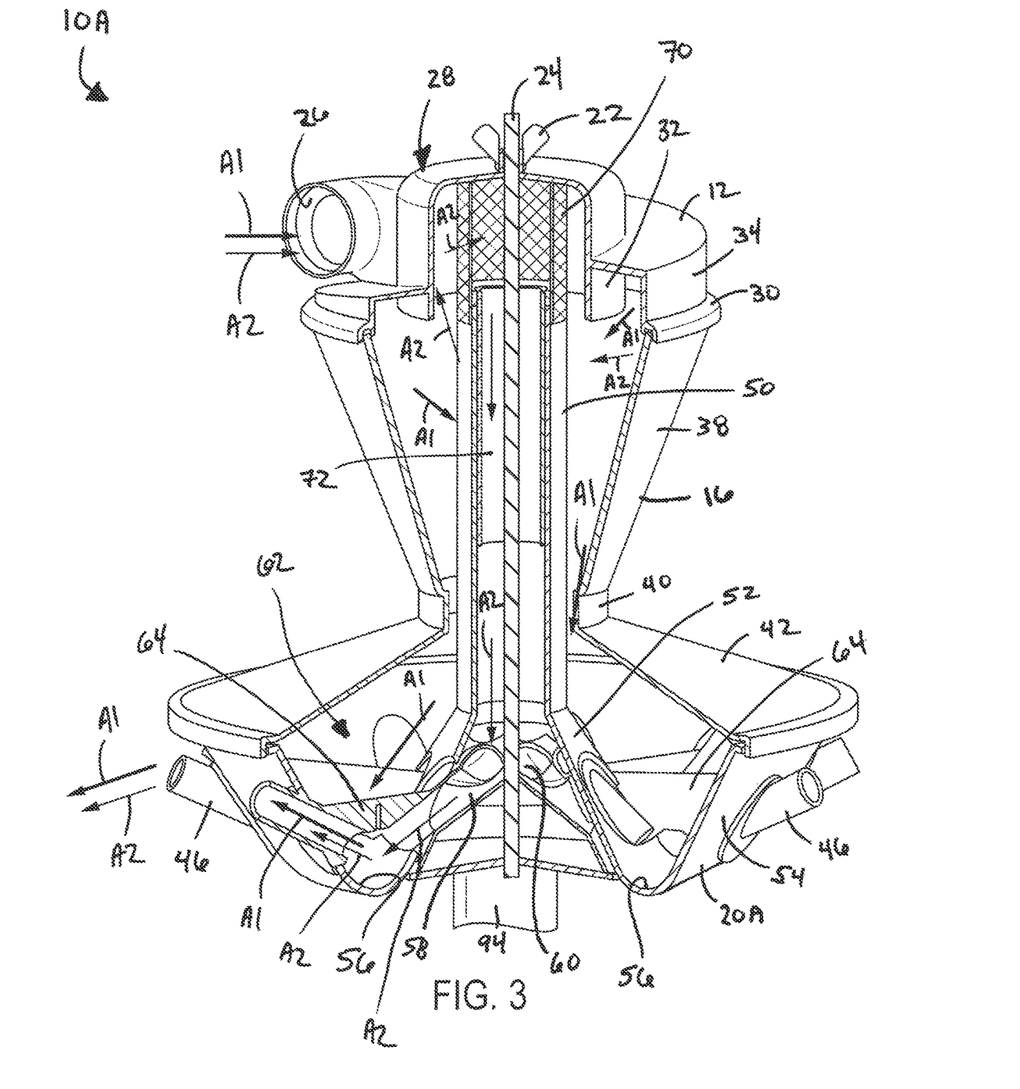
FIG. 3 is a partial cutaway of the seed dispersion unit shown in FIG. 2.

FIG. 2 illustrates a seed dispersion unit 10A for a seeding apparatus 2. The seed dispersion unit 10A includes a cover 12 located above a sidewall 16 and an annular base 20A forming a lower portion of the dispersion unit 10A. The cover 12 serves as a lid and may be held in place against the sidewall 16 via a clamping force from a fastener such as a wing nut 22, as shown in FIG. 2. The wing nut 22 may be threaded upon a central threaded rod 24, which extends through a portion of the seed dispersion unit 10A. The cover 12 contains a circular opening or inlet 26 which can be removably coupled to a rank of tubes 45, 49, thereby connecting the seed dispersion unit 10A to the seed tank 18 and the source of air 37. A top surface 28 of the cover 12 decreases helically about a central portion 32 of the cover 12 from approximately the height of the inlet 26 to a lip 30 at the lowest point of the cover 12. As shown in FIG. 3, the central portion 32 extends internally downward until coplanar with the lip 30 to create a three-sided passage along the angular length of the helical periphery 34. The cover 12, in addition to all internal components of the seed dispersion unit 10A may be constructed of a durable plastic or metal material, or an alternative material resistant to deterioration from impacting seeds.

As shown in FIG. 2, the sidewall 16 includes three portions: an upper portion 38, a middle portion 40, and a lower portion 42. The upper portion 38 is frustoconical such that the circular cross-section of the upper portion 38 decreases in size linearly from the cover 12 to the middle portion 40. At the cover 12, the upper portion 38 has a circular cross-section sized for mating with the cover 12 such that the lip 30 of the cover 12 rests upon the mating surface of the upper portion 38.

The middle portion 40 is positioned between the upper portion 38 and the lower portion 42 and fixes the upper portion 38 to the lower portion 42. The middle portion 40 has a constant circular cross-section. The placement of the middle portion 40 reduces the abruptness of the transition between the upper and lower portions 38, 42. The middle portion 40 may be molded in a single piece with the upper portion 38.

The lower portion 42 is frustoconical with an opposite orientation to the upper portion 38 such that the circular cross-section of the lower portion 42 increases in size linearly from the middle portion 40 to the base 20A. At the base 20A, the lower portion 42 includes a lip 44, which rests upon a mating surface of the base 20A. The lower portion 42 may be molded in a single piece with the upper and middle portion 38, 40.

The base 20A supports a number of outlet conduits 46 extending radially about the base 20A, evenly spaced from one another. As shown (FIG. 7), the base 20A includes ten outlet conduits 46; each radially spaced from one another at equal intervals, configured to each feed a separate secondary conduit 48 (FIG. 1). The number of outlet conduits 46 may vary based on the size of the seeding apparatus 2 and the number of secondary conduits 48 (e.g., 2 conduits, 5 conduits, 8 conduits, 12 conduits, 15 conduits, 20 conduits) that each dispersion unit 12 is configured to feed, and therefore the equal intervals additionally varies (e.g., 180 degrees, 72 degrees, 45 degrees, 30 degrees, 24 degrees, 18 degrees, respectively). In some applications, the intervals need not be equidistant apart due to spacing or other concerns. The outlet conduits 46 are tubular and are sized to mate with the secondary conduits 48 and, as shown, may have a smaller cross-sectional area than the inlet 26. As illustrated in FIG. 3 and as described in more detail below, the base 20A is formed integrally with or coupled to a central air tube 50.

The central air tube 50 extends in a vertical direction V (FIG. 5C) from the base 20A through the sidewall 16 and to the cover 12. The central air tube 50 is generally cylindrical though may flare outwards at the end adjacent the base 20A for continuity with the external circular cross-section of the base 20A. Specifically, the flared portion 52 connects to the outer wall portion 54 of the base 20A via a rounded portion 56 which defines the lowermost region of the base 20A in the form of an annular depression or trough 56 in communication with all outlet conduits 46. The circular cross-section of the central air tube 50 has a radius less than that of the circular cross-section of the middle portion 40 of the sidewall 16 such that a gap exists between the middle portion 40 and the central air tube 50.

As shown, the flared portion 52 of the central air tube 50 includes a number of internal air conduits 58 adjacently positioned at an air dispersion point 60 within the central tube 50, the internal air conduits 58 configured to create a path through the central air tube 50, connecting the interior of the central air tube 50 with the interior of the base 20A. The number of air conduits 58 coincides with the number of outlet conduits 46, each air conduit 58 extends from the air dispersion point 60 to the trough 56 and is generally aligned with one of the outlet conduits 46.

Figure 5A:
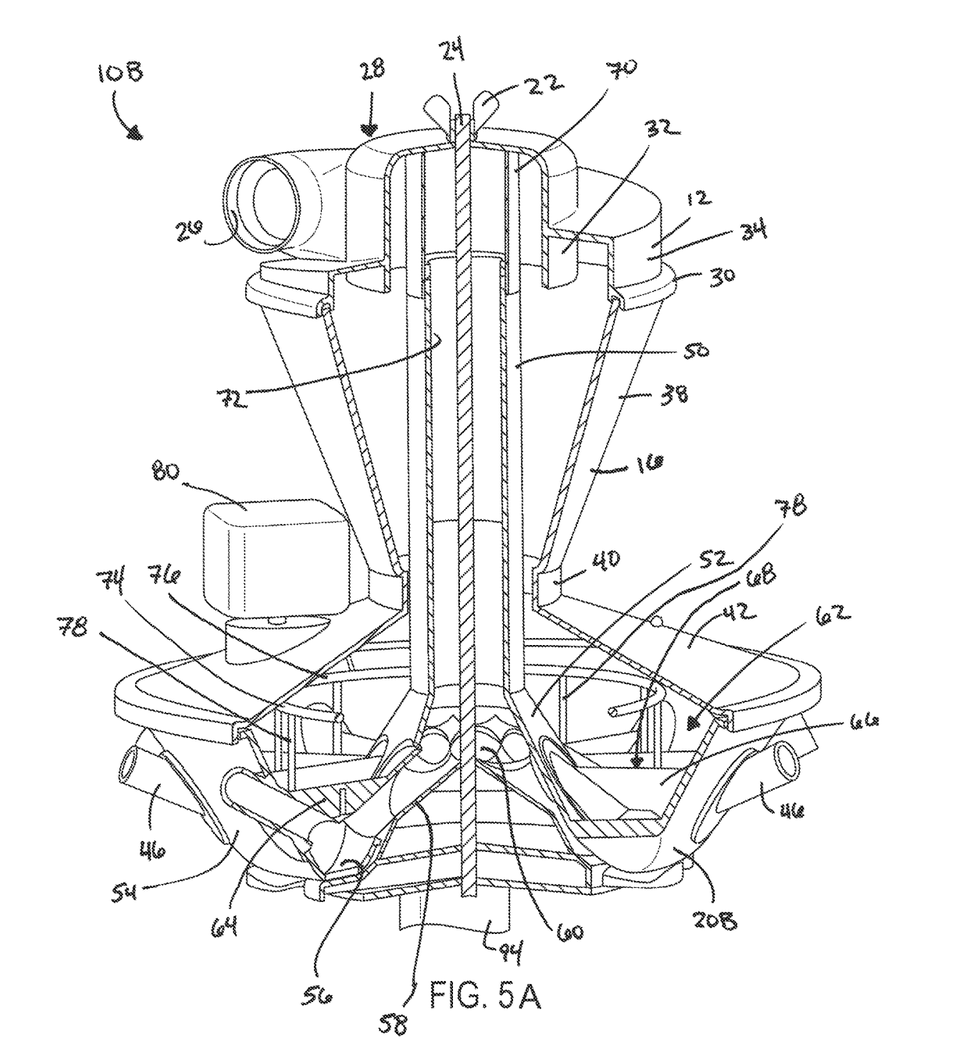
FIG. 5A is a perspective view of a seed dispersion unit with an agitator.
Figure 5B:
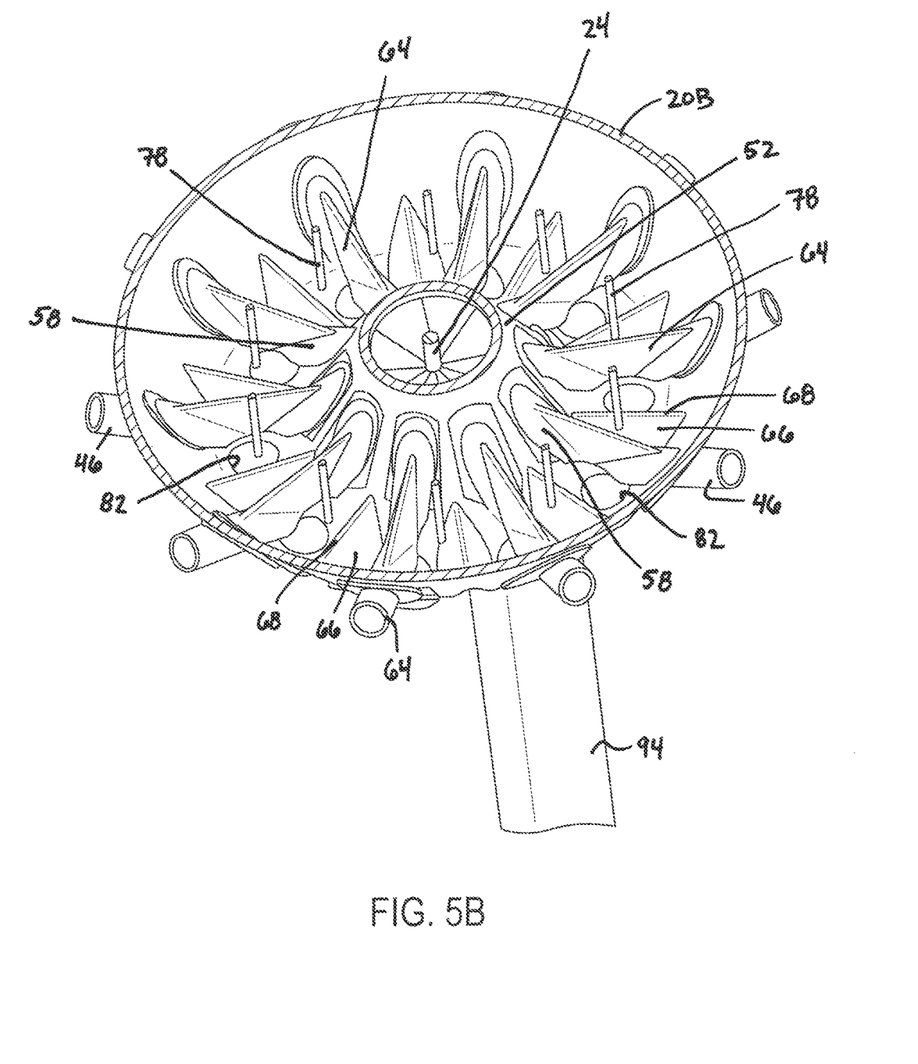
FIG. 5B is a cutaway perspective view of a lower portion of the seed dispersion unit of FIG. 5A.
Figure 5C:
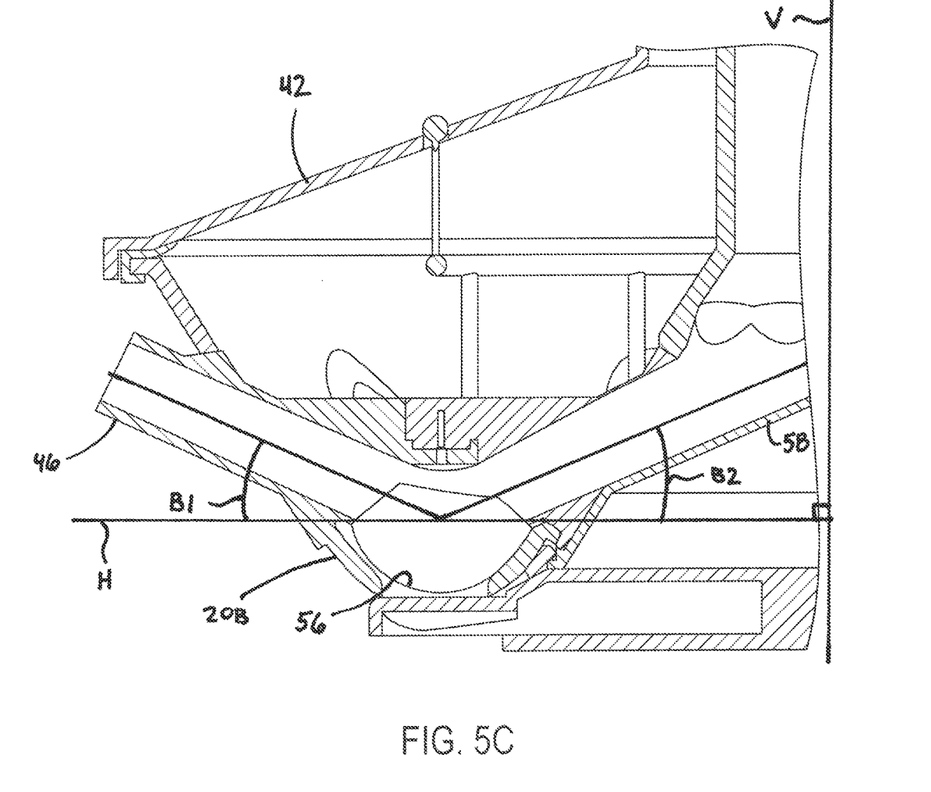
FIG. 5C is a partial cross sectional view of a portion of the seed dispersion unit of FIG. 5A.

Referring to FIG. 5C, the outlet conduits 46 are angled upwards at an angle B1 relative to horizontal H, which is orthogonal to the vertical direction V (e.g., 15 degrees above horizontal, 30 degrees above horizontal, 45 degrees above horizontal, etc.). The air conduits 58 are angled at an angle B2 relative to a horizontal H from the trough 56 into the central air tube 50 (e.g., 15 degrees above horizontal, 30 degrees above horizontal, 45 degrees above horizontal, etc.). The angle B2 may be equivalent to the angle B1 of the outlet conduits 46.

The area between the central air tube 50, the base 20A, and the cover 12 defines a seed chamber 62. As illustrated, each air conduit 58 terminates at a generally tubular end within the formed chamber 62 and more specifically within the trough 56. Each outlet conduit 46 also includes a generally tubular end positioned within the formed chamber 62 and more specifically within the trough 56. The respective ends are noncontinuous, i.e., the air conduit 58 does not continue uninterrupted to the respective outlet conduit 46.

The base 20B, as shown in FIGS. 5A-7, further includes a number of roofs 64 and diverters 66 located within the interior of the base 20A. The roofs 64 and diverters 66 are shown most clearly in FIG. 5B, which shows a partial perspective view of the lower portion of the base 20A. The roofs 64 extend from an outer surface of each internal air conduit 58 to an outer surface of a corresponding outlet conduit 46, as illustrated. The diverters 66 extend from the wall portion 54 and are located along the annular trough 56, the number of diverters 66 coinciding with the number of outlet conduits 46. The diverters 66 are spaced radially about the annular trough 56 and located between and equidistant from two adjacent outlet conduits 46. Each diverter 66 includes a ridge 68, which defines the highest edge of the diverter 66. As shown in FIGS. 5A-7, the diverter 66 may be integrally formed with the base 20B.

Referring again to FIG. 3, at the end of the central air tube 50 adjacent the cover 12, the wall of the central air tube 50 is made of an air-permeable material 70 such as a mesh. The mesh extends from the top of the central air tube 50 (i.e., adjacent the cover 12) to a point no lower than the central portion 32 of the cover 12 or no lower than the lip 30 of the cover 12.

Figure 4:
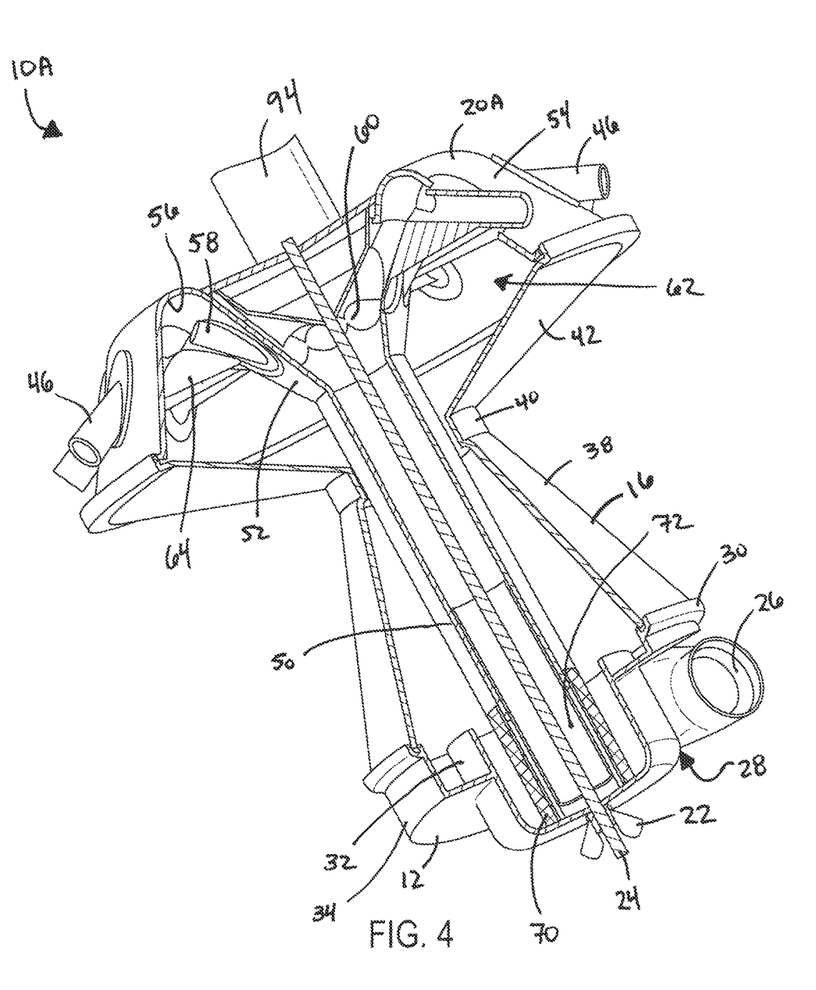
FIG. 4 illustrates the partial cutaway of the seed dispersion unit of FIG. 2 with a mesh guard shown in the storage position.

A mesh guard 72 is located within the central air tube 50. The mesh guard 72 is a cylinder sized to slide along the length of the central air tube 50 with limited play in the radial direction (i.e., the external diameter of the mesh guard 72 may be similar, with minimal clearance, to the internal diameter of the central air tube 50). In a first position, as shown in FIG. 3, the mesh guard 72 is located below the air-permeable material 70. When the seed dispersion unit 10A is in a storage position, as shown in FIG. 4, the mesh guard 72 is located directly adjacent the air-permeable material 70.

As shown in FIG. 5A, an agitator 74 may be located within the base 20B. The agitator 74 is a ring-like structure 76 supported with protrusions 78 extending from the ring structure 76 to a portion of the base 20B. The protrusions 78 may be made of a rigid material with some degree of flexibility. The agitator 74 is connected to a motor 80 which is operable to drive the agitator 74.

Figure 6:
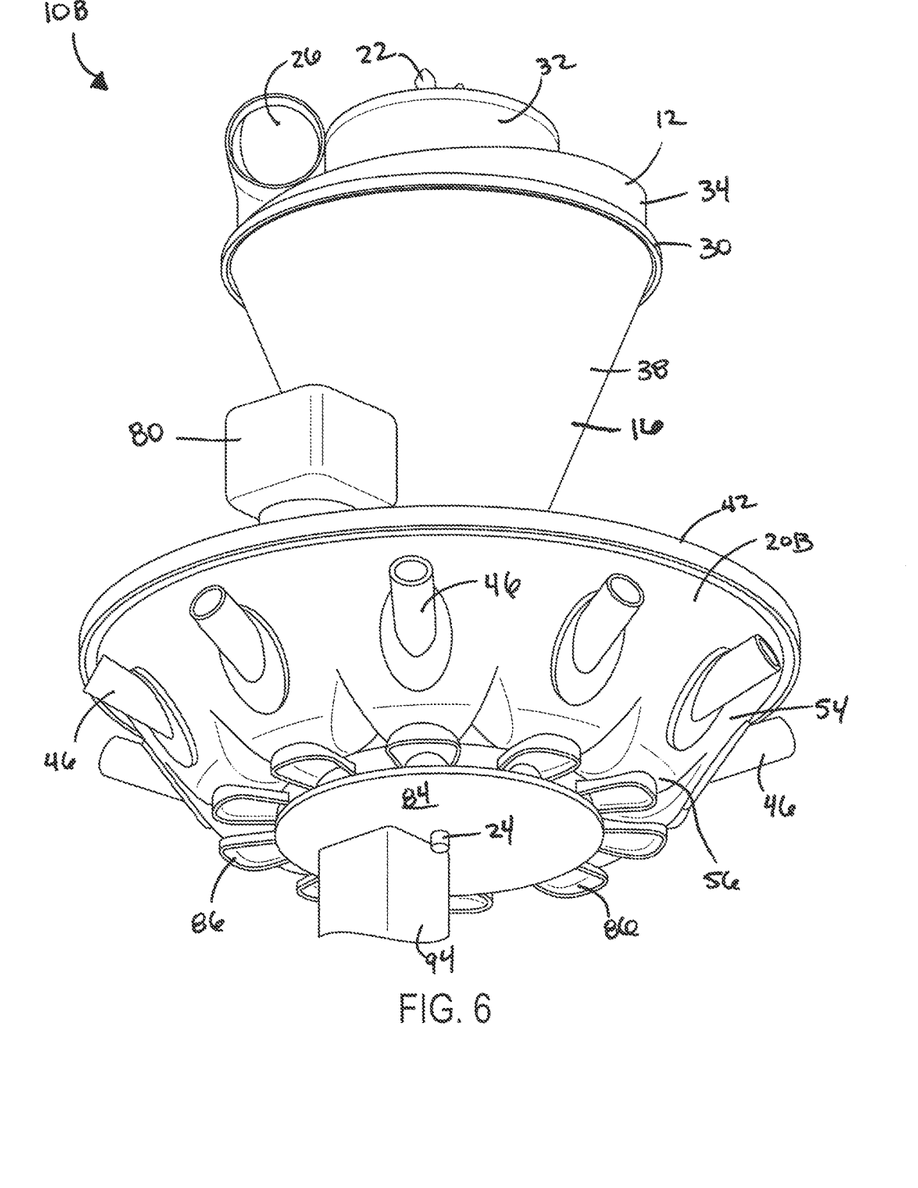
FIG. 6 is a lower perspective view of the seed dispersion unit of FIG. 5A including a cleanout cover shown in a closed position.
Figure 7:
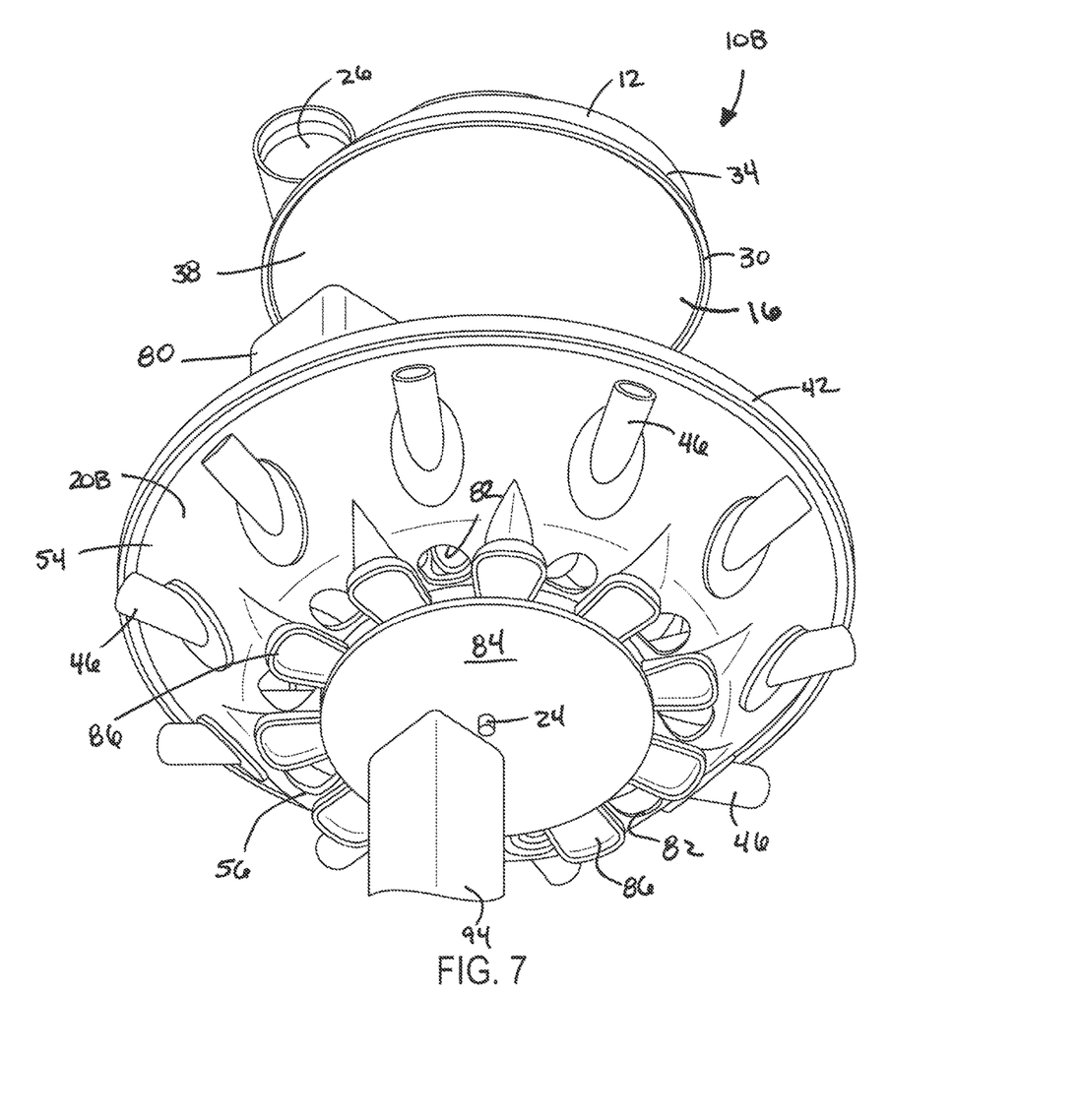
FIG. 7 is a perspective view of the seed dispersion unit of FIG. 5A including a cleanout cover shown in the open position.

Referring also to FIGS. 6-7, the base 20B may include cleanout ports 82 located below each outlet conduit 46 or between each pair of adjacent diverters 66. Each cleanout port 82 is an opening located along the lowermost region 56 of the base 20B and provides access within the base 20B. A rotatable cleanout structure 84 may be fixed to the base 20B and includes a number of covers 86 for the cleanout ports 82.

Each cover 86 is sized to block one of the cleanout ports 82 in a first orientation (FIG. 6) and unblock the respective cleanout port 82 in a second orientation (FIG. 7). The cleanout structure 84 is operable to rotate about a central axis and may physically rotate about the threaded rod 24.

Figure 8:
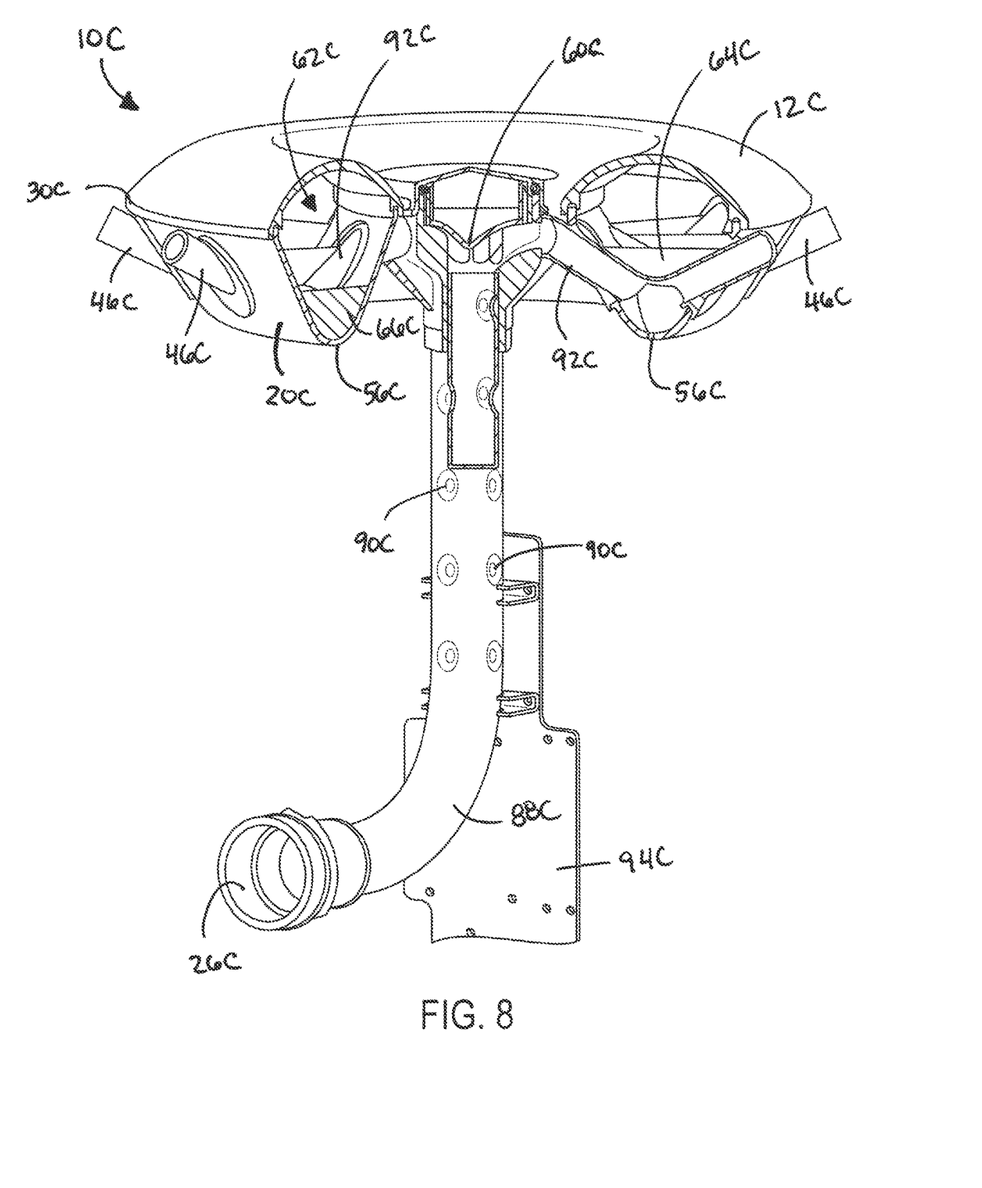
FIG. 8 is a perspective view of a seed dispersion unit.

As shown in FIG. 8, a seed dispersion unit 10C may include a J-tube 88C, a base 20C, and a cover 12C. The J-tube 88C is formed with an inlet 26C located at a lowermost point; the J-tube 88C extending horizontally from the inlet 26C, around a curve or elbow, and into the base 20C. The J-tube 88C includes a number of dimples 90C impressed into the vertical portion, which terminates at a number of internal conduits 92C that extend radially about the J-tube 88C at equal intervals. The junction between the J-tube 88C and the internal outlet conduits 92C defines a dispersion point 60C. The internal outlet conduits 92C may be integral with the base 20C.

The base 20C is fixed to the J-tube 88C adjacent the internal outlet conduits 92C, the base 20C overlapping the J-tube 88C to provide a seal. The base 20C extends about the periphery of the internal outlet conduits 92C in a V-shaped trench or trough 56C, with a soft corner at the vertex of the "V", similar to the annular trough 56 of the seed dispersion units shown in FIGS. 2-7. Further, the base 20C includes outlet conduits 46C, roofs 64C, and diverters 66C, each outlet conduit 46C aligning with the respective internal outlet conduit 92C; each roof 64C located above each respective internal outlet conduit 92C; and each diverter 66C located between adjacent internal outlet conduits 92C. All of the outlet conduits 46C, roofs 64C, and diverters 66C are similar in design and location to the components described with respect to FIGS. 2-7.

The cover 12C includes an arcuate cross-section (in-plane with the V-shaped trench) as shown by the cutaway section of FIG. 8 and located above the V-shaped trench 56C, and which partially delimits a seed chamber 62C. The cover 12C includes an outer lip 30C and an inner lip 30C for mating with and fixing to the edges of the V-shaped trench 56C. Collectively, the cover 12C and the peripheral portion of the base 20C form a toroidal shape with a non-circular cross-section.

Figure 9:
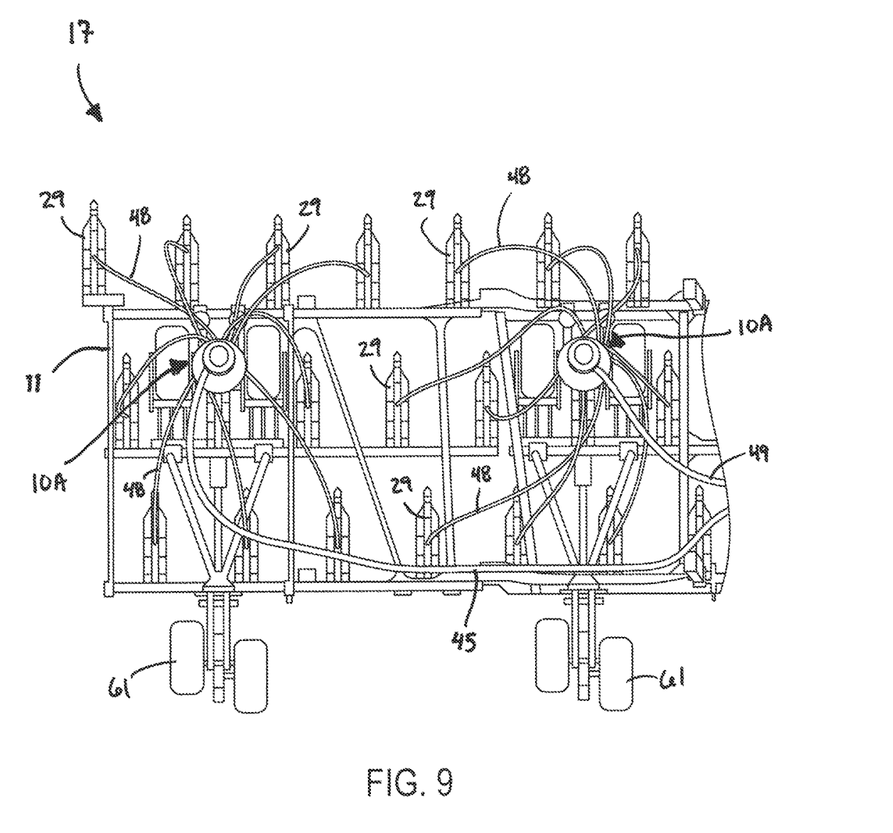
FIG. 9 is a partial top view of a tilling implement including a number of seed dispersion units.

A frame member 94, 94C may be attached to the base 20A (FIGS. 2-4), the cleanout structure 84 (FIGS. 5A-7), or the J-tube 88C (FIG. 8) and further attached to the frame 11 of the tilling implement 17 to fix the seed dispersion unit 10A, 10B, 10C to the tilling implement 17. As shown in FIG. 9, each seed dispersion unit 10A is fixed to the frame 11, and is centrally located amongst ten tilling implements. It is well understood that seed dispersion units 10B, 10C could alternatively be implemented. Each of the secondary conduits 48, which mate with a corresponding one of the outlet conduits 46 at one end, is positioned in communication with one of the ground openers 29 at the second end. A single main conduit 45, 49 (FIG. 9) provides seeds to the seed dispersion unit 10A, the path of the seeds through the dispersion unit shown with bolded arrows A1 (FIG. 3). Although the term "seeds" is used throughout the application, the invention can be used with other agricultural particles such as fertilizer.

In operation, seeds are metered or delivered from the seed tank 18 and carried through the main conduit 45, 49 to the dispersion unit 10A via an air current. Referring to FIG. 3, the path of the air current through the dispersion unit is shown with un-bolded arrows A2. The seeds enter the inlet 26 and, with adequate momentum provided by the air current, follow the helical periphery 34 of the cover 12 until they reach the upper portion 38 of the sidewall 16. Due to the helical path of the cover 12 and the funnel shape of the upper portion 38, the seeds may have a rotational velocity about the upper portion 38 as gravity carries the seeds towards the middle portion 40 of the sidewall 16. This assists in randomizing the location of the seeds at the base 20A. The seeds drop through the middle portion 40, past the lower portion 42, and into the base 20A. More specifically, the seeds may cascade off of roofs 64 and diverters 66, settling in the annular trough 56.

Once through the inlet 26, the air current is capable of moving along a path distinct from the path of the seeds. Due to the location and the presence of the air-permeable material 70 through which seeds cannot pass, at least some of the air current passes through the air-permeable material or air inlet 70, into the central air tube 50 and exits through the air outlet conduits 58. The air outlet conduits 58 feed the air current into the lowermost region 56 of the base 20A, moving the seeds within the annular trough 56 into the associated outlet conduit 46.

Each outlet conduit 46 feeds an associated secondary conduit 48, and seeds are carried to the ground openers 29 for planting. Though not shown, additional metering (e.g., singulating, etc.) may occur downstream of the seed dispersion unit 10A yet upstream of planting. In comparison to other seed dispersion units which do not radially distribute seeds and which do not include outlet conduits 46 located radially about the seed dispersion unit, the seed dispersion unit 10A may be located centrally relative to the numerous ground openers 29 it feeds, and the secondary conduits 48 may consequently be similar in length. With less variability in length, the pressure drop through each secondary conduit 48 is more uniform, thereby providing more consistent seeding at each furrow.

As shown in FIG. 4, in a storage position, the mesh guard 72 slides to cover the air-permeable material 70. This prevents compression of the material 70 should any remaining seeds within the seed dispersion unit 10A, 10B be pressed against the material 70 in the upturned storage position as shown. In comparison, as shown in FIG. 3, the mesh guard 72 does not hinder air passage through the air-permeable material 70 when not in the upturned storage position.

For certain seeds, the packing density of the seeds in the annular trough 56 of the base 20B may hinder the air current (from the air outlet conduit) from carrying the seeds through the outlet conduit. The protrusions 78 of the agitator 74 (FIGS. 5A-5C), vibrated or driven by the motor 80, may upset the settled seeds, allowing the air current to carry some or all of the seeds through the outlet conduit. Alternatively or additionally, the agitator 74 may be used in place of the diverters 66 to ensure that seeds which settle in the annular trough 56 of the base 20B align with the air outlet conduits 58 and outlet conduits 46.

As shown in FIGS. 6-7, the cleanout structure 84 can be rotated from the first orientation (FIG. 6) in which the cleanout structure 84 blocks the cleanout ports 82 to the second orientation (FIG. 7) in order to open the cleanout ports 82 and provide user access to the cleanout ports 82. The cleanout ports 82 may be accessed when the seed dispersion unit 10A is in either the upright (FIGS. 2-3) position or the upturned storage position (FIG. 4). If the cleanout ports 82 are accessed in the upright position, any seeds within the seed dispersion unit 10A, 10B fall via gravity through the cleanout ports 82, thereby emptying the seed dispersion unit 10A. In either orientation, when the dispersion unit 10B is not actively distributing seeds, a user may be able to use the cleanout ports 82 to manually dislodge or stir the seeds, similar to the function of the protrusions 78 of the agitator 74.

Referring to FIG. 8, seeds and the air current enter the seed dispersion unit 10C of FIG. 8 through the inlet 26C. The seeds round the bend in the J-tube 88C and are carried upward against gravity via the air current. The dimples 90C located in the J-tube 88C tumble the seeds in various directions, thereby randomizing the flow of seeds to the dispersion point 60C. At the dispersion point 60C, the air current and seeds are distributed among the interior conduits 92C. Unlike the seed dispersion units 10A, 10B of FIGS. 2-7, the air current and seed paths do not separate from one another. Instead, the interior conduits 92C lead both the seed and the air current to the annular trough 56C of the base 20C. From the annular trough 56C, the air current carries the seeds through the outlet conduits 46C to respective secondary conduits 48 and furrows, as described above with respect to FIGS. 2-7. If one interior outlet conduit 92C receives more seeds than another, the seeds within that local portion of the annular trough 56C may disperse throughout the adjacent portions of the annular trough 56C to be accessed by other outlet conduits 46C.

Various features of the disclosure are set forth in the following claims.

What is claimed is:

1. A seed dispersion unit for distributing a plurality of seeds, the seed dispersion unit comprising:
a single inlet for the plurality of seeds;
a chamber in communication with the single inlet;
a plurality of outlet conduits in communication with the chamber, each outlet conduit of the plurality of outlet conduits configured to transfer a portion of the plurality of seeds from the chamber;
an annular base defining a portion of the chamber, wherein each outlet of the plurality of outlet conduits extends radially from the base; and
a central air tube including an air inlet and an air outlet, wherein the air outlet includes a plurality of air conduits that terminate within the chamber, and wherein the air inlet includes an air-permeable material operable to preclude the plurality of seeds from entering the air inlet.

2. The seed dispersion unit of claim 1, wherein each air conduit is radially aligned with one of the plurality of outlet conduits.

3. The seed dispersion unit of claim 2, wherein each air conduit is angled with respect to the respective one of the plurality of outlet conduits by greater than 30 degrees.

4. The seed dispersion unit of claim 1, wherein the air conduits are each separated by a ridge extending from the base.

5. The seed dispersion unit of claim 1, wherein the single inlet follows a helical path into the chamber.

6. The seed dispersion unit of claim 1, wherein each air conduit of the plurality of air conduits terminates within the chamber.

7. The seed dispersion unit of claim 6, wherein each air conduit of the plurality of air conduits is noncontinuous with the respective one of the plurality of outlet conduits.

8. The seed dispersion unit of claim 1, further comprising an agitator positioned within the chamber and operable to vibrate within the chamber.

9. A seeding system for planting a plurality of seeds, the seeding system comprising:
a frame;
a seed dispersion unit coupled to the frame and including an inlet and a chamber at least partially defined by an annular wall;
a plurality of ground openers, each ground opener of the plurality of ground openers operable to produce a furrow;
a plurality of conduits, each conduit of the plurality of conduits positioned to transfer a portion of the plurality of seeds from the chamber to one of the furrows; and
a central air tube in communication with the inlet and ending in a plurality of air conduits within the chamber,
wherein each conduit of the plurality of conduits extends through the annular wall, and
wherein each air conduit of the plurality of air conduits includes a first tubular end positioned within the chamber, and wherein the plurality of conduits is positioned to transfer a portion of the plurality of seeds from the chamber to one of the furrows, and wherein each air conduit includes a second tubular end positioned within the chamber.

10. The seeding system of claim 9, wherein the first tubular end is noncontinuous with the second tubular end.

11. The seeding system of claim 10, wherein a portion of the first tubular end is rigidly connected to a portion of the second tubular end.

12. The seeding system of claim 9, wherein the central air tube includes an air-permeable material operable to preclude the plurality of seeds from entering the central air tube.

13. The seeding system of claim 9, wherein each air conduit is radially aligned with one of the plurality of outlet conduits.

14. The seeding system of claim 9, wherein each conduit of the plurality of conduits extends radially through the annular wall.

15. The seeding system of claim 9, wherein each air conduit is angled with respect to the one of the plurality of outlet conduits by greater than 30 degrees.

16. The seeding system of claim 9, wherein each air conduit of the plurality of air conduits within the chamber is separated from another of the plurality of air conduits by a ridge extending from the annular wall.

* * * * *